United States Patent
Koga et al.

(10) Patent No.: US 8,256,822 B2
(45) Date of Patent: Sep. 4, 2012

(54) DRIVING FORCE TRANSMITTING DEVICE AND VEHICLE SEAT SLIDE DEVICE

(75) Inventors: Yoshitaka Koga, Chiryu (JP); Hirokazu Suzumura, Aichi-gun (JP); Jueru Shimizu, Handa (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 340 days.

(21) Appl. No.: 12/732,621

(22) Filed: Mar. 26, 2010

(65) Prior Publication Data
US 2010/0242650 A1 Sep. 30, 2010

(30) Foreign Application Priority Data
Mar. 27, 2009 (JP) .................................. 2009-078562

(51) Int. Cl.
*B60N 2/02* (2006.01)
*F16H 1/12* (2006.01)
(52) U.S. Cl. ......................... 296/65.15; 248/429; 74/416
(58) Field of Classification Search .............. 296/65.15, 296/65.13, 65.14; 248/429, 430; 74/416
See application file for complete search history.

(56) References Cited

U.S. PATENT DOCUMENTS

| 5,823,499 | A | * | 10/1998 | Ito et al. ......................... 248/429 |
| 7,325,851 | B2 | * | 2/2008 | Ito et al. ..................... 296/65.13 |
| 7,503,537 | B2 | * | 3/2009 | Koga ............................. 248/429 |
| 7,658,429 | B2 | | 2/2010 | Koga et al. |
| 2008/0238167 | A1 | | 10/2008 | Koga et al. |
| 2010/0013284 | A1 | | 1/2010 | Koga et al. |
| 2010/0051776 | A1 | | 3/2010 | Koga et al. |

FOREIGN PATENT DOCUMENTS
FR 2 928 880 A1 9/2009
WO WO 2008/087947 A1 7/2008
* cited by examiner

*Primary Examiner* — Joseph Pape
(74) *Attorney, Agent, or Firm* — Oblon, Spivak, McClelland, Maier & Neustadt, L.L.P.

(57) ABSTRACT

A driving force transmitting device having a direction changing gear mechanism which transmits a rotation torque from a drive shaft to a driven shaft having an axis extending in a direction different from a direction of an axis of the drive shaft. The direction changing gear mechanism includes an output, an input gear attached to the drive shaft for restricting a relative rotation and engaged with the output gear, a gear housing rotatably supporting the output gear and the input gear under engagement condition, wherein one of the output gear and the input gear is provided with a rotation phase adjusting portion exposed outside for adjusting a rotation phase of the output gear relative to a rotation phase of the second engagement portion of the driven shaft upon the output gear being assembled to the driven shaft.

20 Claims, 7 Drawing Sheets

DRIVING FORCE TRANSMITTING DEVICE AND VEHICLE SEAT SLIDE DEVICE

CROSS REFERENCE TO RELATED APPLICATIONS

This application is based on and claims priority under 35 U.S.C. §119 to Japanese Patent Application 2009-078562, filed on Mar. 27, 2009, the entire content of which is incorporated herein by reference.

TECHNICAL FIELD

This disclosure relates to a driving force transmitting device and a vehicle seat slide device to which the driving force transmitting device is adapted.

BACKGROUND DISCUSSION

In a known vehicle power seat, various driving force transmitting devices are proposed which transmit a rotation torque of a drive shaft rotated by a driving source, such as a motor, to a driven shaft having an axis extending in a direction different from a direction of an axis of the drive shaft. In these devices, the rotation torque is transmitted by engaging a worm gear of the drive shaft with a helical gear of the driven shaft. The worm gear and the helical gear are rotatably accommodated in a supporting member (gear housing). One of such driving force transmitting devices is shown in a patent document 1, in which the driving force transmitting device for transmitting the rotation torque of the drive shaft to a screw shaft, includes a worm gear provided at the drive shaft, a helical gear provided at the screw shaft, and a gear case (a portion of a gear housing) having a pair of first bearing wall portions, a pair of second bearing wall portions formed integrally with the pair of first bearing wall portions and an opening at one side for accommodating the worm gear and the helical gear from the opening. The first bearing wall portions are provided opposite to the axial line direction of the drive shaft and rotatably supporting the both end portions of the worm gear and the second bearing wall portions are provided opposite to an axis direction of the screw shaft and rotatably supporting the both end portions of the helical gear. According to the patent document 1, since the pair of first bearing wall portions rotatably supporting the both end portions of the worm gear and the pair of second bearing wall portions rotatably supporting the both end portions of the helical gear are integrally formed, accurate positioning of each gear relative to each shaft can be easily achieved. Further, one gear engaging with the other gear being assembled bisecting with right angles, can be easily inserted into the opening provided at one side for easy assembling of the gears into the hear case.

Patent Document 1: WO2008/087947A1

However, according to the driving force transmitting device of the patent document 1, a motor as a drive force source for the power seat and a speed reduction portion with direction changing gear mechanism are structured as a unit and supported by a bracket. The screw shaft is set to the speed reduction portion with the rail as a unit to which the speed reduction portion with direction changing gear mechanism has been pre-assembled. Upon assembling, a pair of tip ends of the screw shaft at the paired rail side are respectively inserted into the speed reduction portion with direction changing gear mechanism (edge of the helical gear in the gear case) supported at both sides of the bracket and the speed reduction portion with direction changing gear mechanism is fixed to the attaching bracket from the upper rail side by fastening bolt. Therefore, if the screw shaft side inserting position (rotation phase) at the rail side is deviated from the speed reduction portion (helical gear edge) side inserting position (rotation phase), the screw shaft, which, has been preset to the rail side, is rotated for adjusting the relative rotational position to agree with the position of the helical gear edge. However, since the screw shaft is of an elongated lengthy shape, it is difficult to manually rotate the screw shaft and therefore, the assembling becomes a troublesome work. Further, the pair of right and left side screw shafts, to which the pair of rails is pre-assembled, has to be assembled to the speed reduction portion with direction changing gear mechanism at both sides. If the inserting position of the speed reduction portion side (helical gear edge) is deviated from the corresponding position to be inserted in right/left direction, the assembling work becomes further difficult. Also, if the pitch of pair of rails to be secured to the vehicle floor is deviated from each other, assembling of the driving force transmitting device becomes difficult.

A need thus exists for a driving force transmitting device and a vehicle seat slide device which is not susceptible to the drawback mentioned above.

SUMMARY

According to an aspect of the disclosure, a driving force transmitting device having a direction changing gear mechanism for transmitting a rotation torque of a drive shaft to a driven shaft having an axis extending in a direction different from a direction of an axis of the drive shaft, wherein the direction changing gear mechanism includes an output gear provided with an engaging hole which engages with an engaging portion provided at an axial end of the driven shaft for restricting a relative rotation, an input gear engaging with the output gear and provided at the drive shaft for restricting a relative rotation and a gear housing rotatably accommodating the output gear and the input gear under engagement and wherein a rotational phase adjusting portion is provided at one of the output and input gears and is exposed outside for adjusting the rotational phase of the output gear relative to the engaging portion provided at the driven shaft upon the output gear being assembled to the driven gear.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
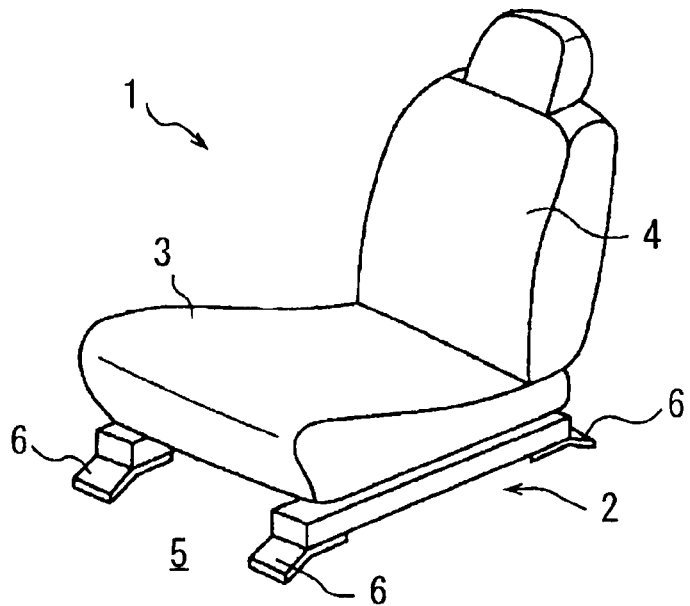
FIG. 1 is a perspective view of a vehicle seat to which a driving force transmitting device according to an aspect of the disclosure is adapted.
Figure 2:
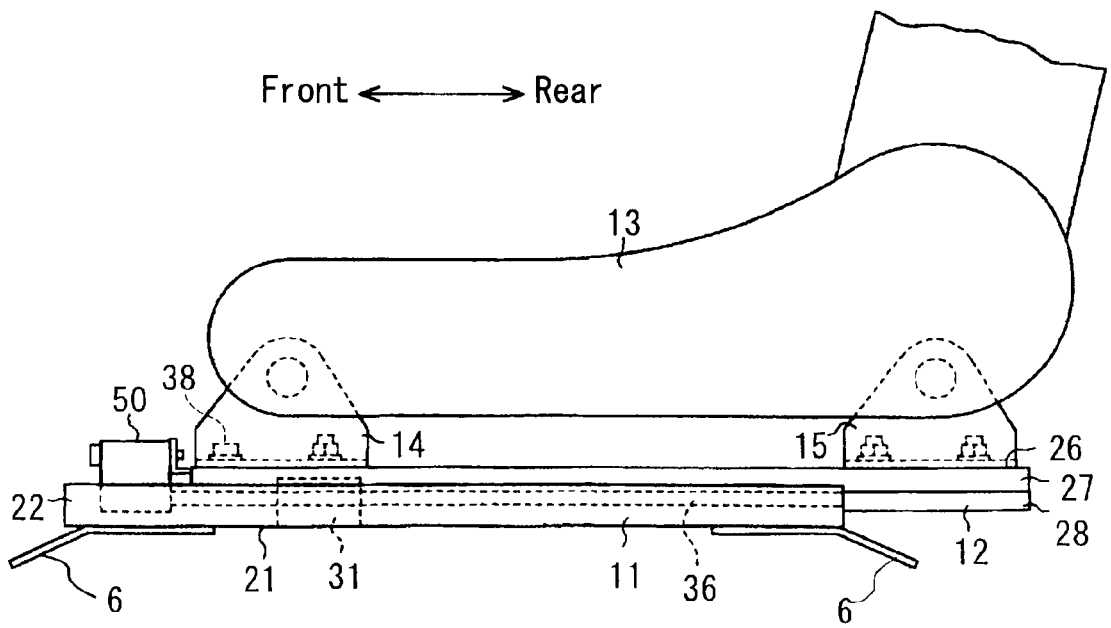
FIG. 2 is an outline of the driving force transmitting device adapted to the vehicle seat device viewed from a side.

A driving force transmitting device adapted to the vehicle seat slide device will be explained hereinafter with reference to the attached drawings. FIG. 1 is a perspective view of the seat 1 with the vehicle seat slide device 2 and FIG. 2 is a side view of the vehicle seat slide device 2. It is noted here that the words "right and left", "front and rear", "width and axial direction" and "upper and down" refer to the direction or position relative to the vehicle.

The seat 1 as shown in FIG. 1, includes a seat cushion 3 supported by the vehicle seat slide device 2 and slidable in a front/rear direction relative to a vehicle floor 5 and a seat back 4 supported at the rear end of the seat cushion 3. The vehicle sea slide device 2 is a powered seat type as shown in FIGS. 2 and 3, and the power seat slide device 2 includes a pair of lower rails 11, a pair of upper rails 12, a screw shaft 36 as a driven shaft, nut member 31 (not shown), a speed reduction device 90 as a speed reduction means a drive motor 47 as a drive actuator a direction changing gear mechanism 50 and a reinforcement bracket 46.

Figure 3:
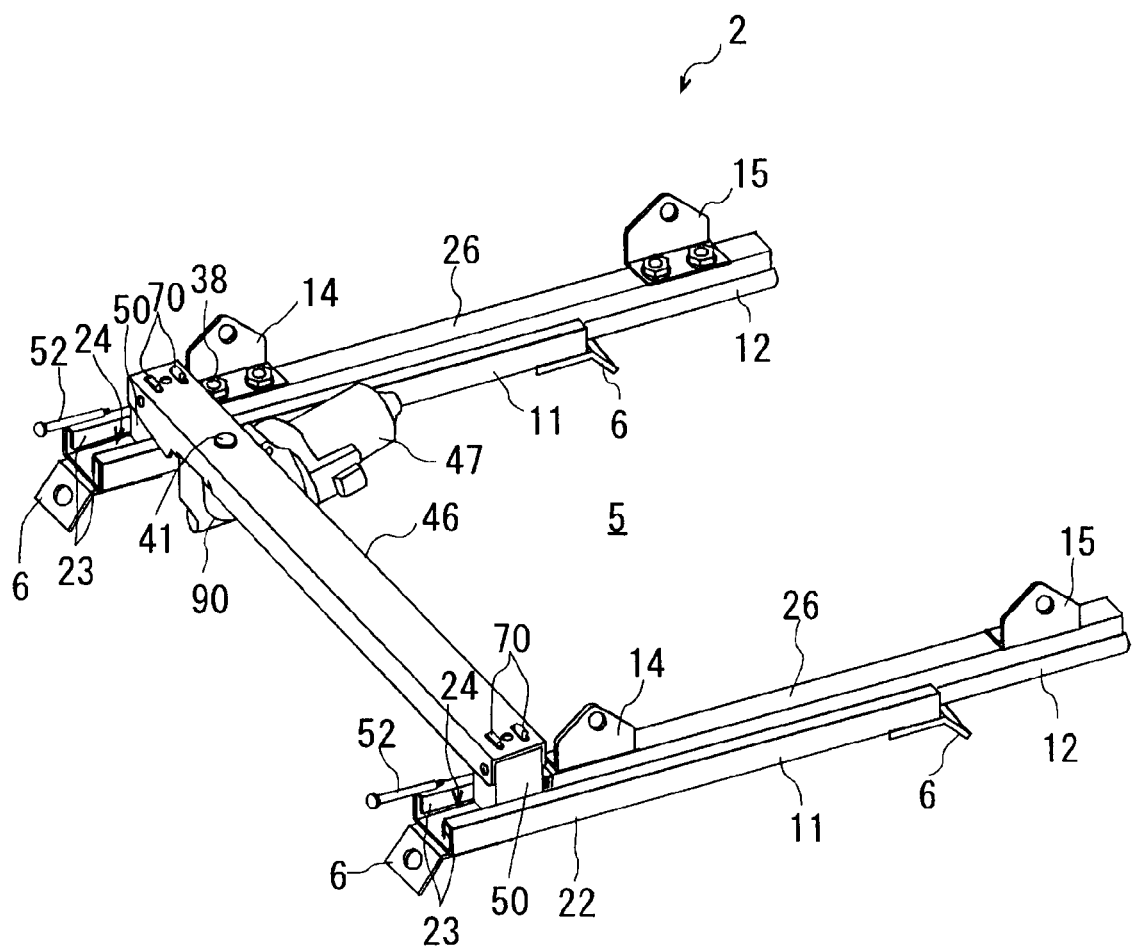
FIG. 3 is a perspective view of the driving force transmitting device adapted to the vehicle seat device.

As shown in FIGS. 2 and 3, the lower rail 11 includes a fixing bracket 6 for fixing the lower rail 11 to a vehicle floor 5. An elongated lengthy member extending in a vehicle front/rear direction forms the lower rail 11 and one pair thereof is formed on the vehicle floor 5 at right and left side. The lower rail 11 has an approximately U-shape in cross section having a bottom wall portion 21, a pair of side wall portions 22 extending upwardly from the both sides of the bottom wall portion 21 and a pair of return wall portions 23 bent inwardly in a width direction from the upper end of each side wall portion 22 and returning downward to form a reverse U-shape with the side wall portions. Numeral 24 designates an opening formed between the return wall portions 23.

The upper rail 12 is formed with a reverse U-shape in cross section and includes a ceiling wall portion 26, a pair of side wall portions 27 extending downward from the both ends of the ceiling wall portion 26 and a pair of return wall portions 28 bent outward in a width direction from the lower end of each side wall portion 27 and returning upwardly to form a U-shape with the side wall portions. The sidewall portions 22 and the return wall portions 23 of the lower rail 11 enclose the return wall portions 28. The upper rail 12 is slidable in a front/rear direction relative to the lower rail 11 via a sliding member (not shown) to be provided in the opening formed by the sidewall portions 22 of the lower rail 11 and the return wall portions 28 of the upper rail 12. Fixing brackets 14 and 15 are attached to the both ends of the ceiling wall portions 26 of the upper rail 12 in a front/rear direction and supporting a pair of lower arms 13 (FIG. 2). The lower arms 13 form the frame of the seat cushion 3 and the upper rail 12 supports the seat cushion 3 via the lower arm 13.

A nut member 31 is fixed to the bottom wall portion 21 of the lower rail 11. The nut member 31 is made from a resin material and has an approximately cuboid shape and is formed with a female screw portion extending through the member 31 in a front/rear direction (FIG. 2).

Figure 4:
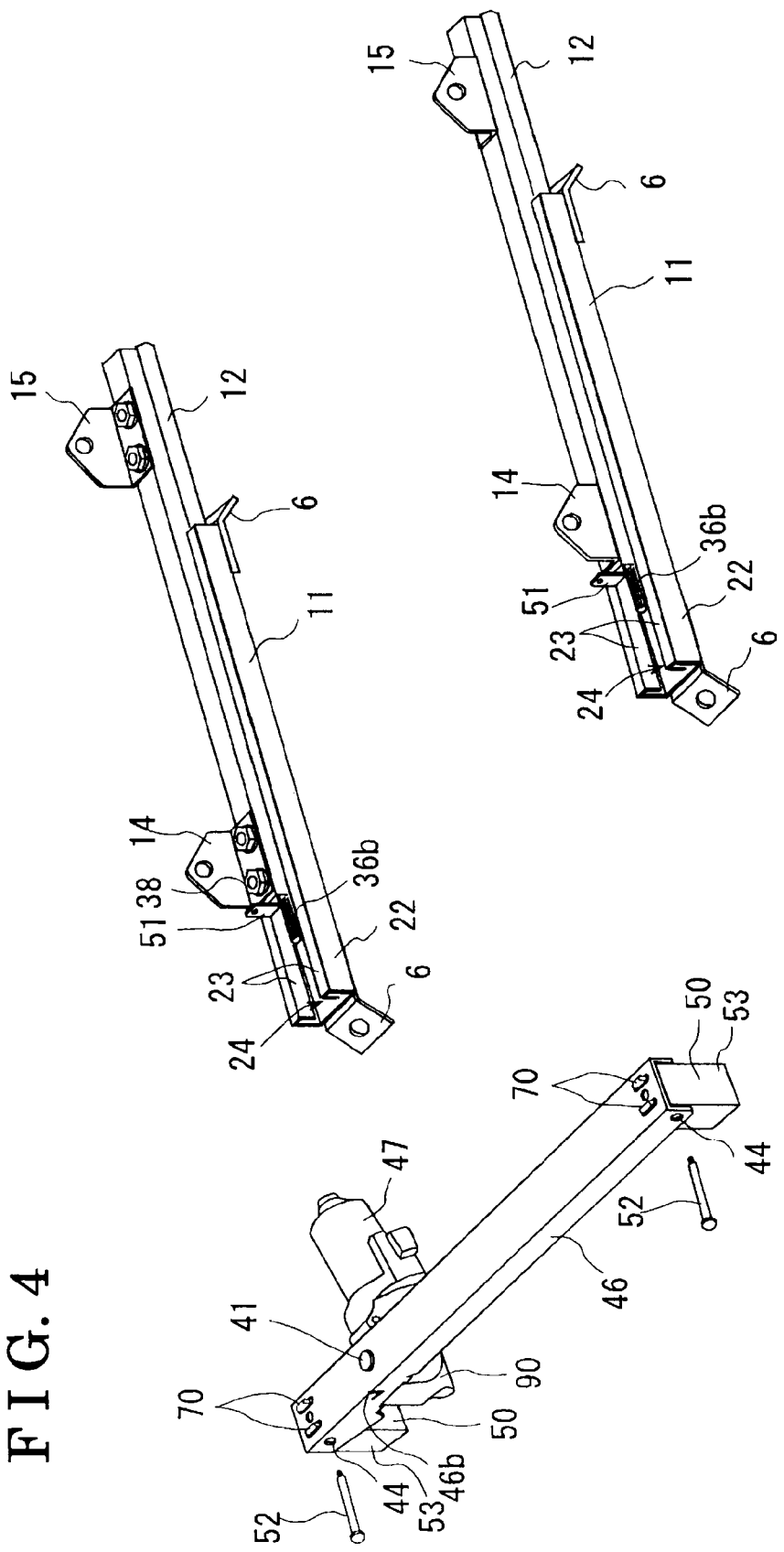
FIG. 4 is a perspective view of the driving force transmitting device before assembling to the vehicle seat device.

The screw shaft 36 is made from a metal material and has a rod shape. The screw shaft 36 has an axial line extending in a front/rear direction. The screw shaft 36 is formed with a screw portion approximately in an entire surface to engage with the female screw portion of the nut member 31. A serration engaging portion 36b is provided at the front end of the screw portion (FIG. 4). The serration engaging portion 36b extends from the front end of the upper rail 12 and projects towards front side over the front end of the upper rail 12. This serration engaging portion 36b forms the engaging portion and has an equiangular polygonal shape in cross section, such as for example, an octagon shape with eight vertices (top portions) and eight valleys.

The screw shaft 36 is supported by the upper rail 12 and relatively rotatable therewith but a relative axial movement between the screw shaft 36 and the upper rail 12 is restricted. When the screw shaft 36 is rotated, the upper rail 12 moves in an axial direction together with the upper rail 12 relative to the nut member 31 (lower rail 11).

Figure 5:
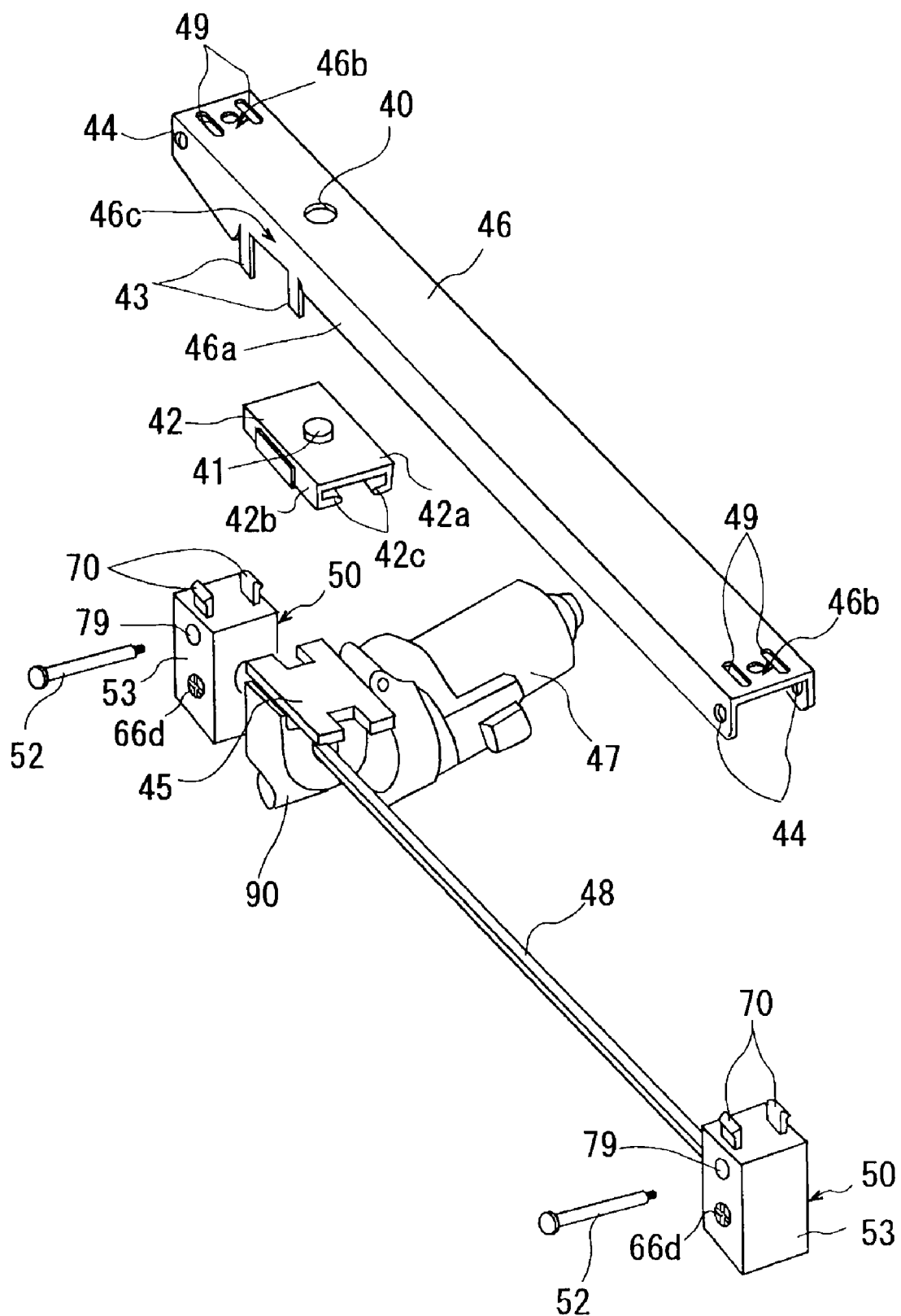
FIG. 5 is a perspective view of the driving force transmitting device before assembled into a unit.
Figure 6:
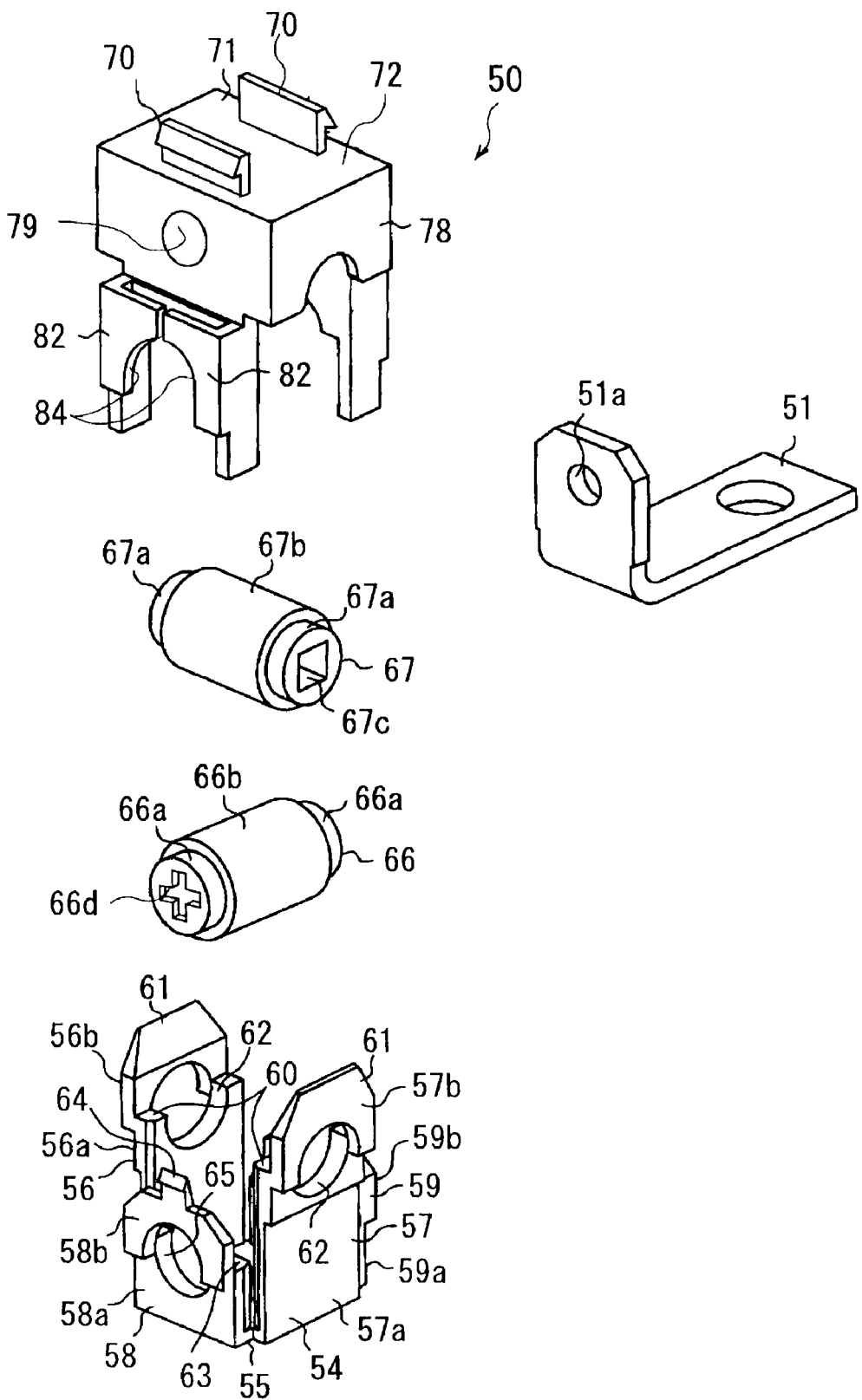
FIG. 6 is an exploded perspective view of a direction changing gear mechanism.

The pair of upper rails 12 is connected with each other by a connecting bracket (reinforcement bracket) 46 at each front end. The connecting bracket 46 extends in a width direction to have a proper distance between the rails 12 for attaching the seat thereon. A drive motor 47 is provided at an intermediate position of the reinforcement bracket 46. (FIG. 3). The drive motor 47 includes a speed reduction device 90 for outputting a torque with a decelerated rotation speed of the motor 47. A detent portion 45 made of H-shaped plate is provided on the speed reduction device 90. (FIG. 5). The speed reduction device 90 is attached to the reinforcement bracket 46 with the detent portion 45 (later explained in detail). The speed reduction device 90 is operatively connected to a driving force transmitting shaft (drive shaft) 48 extending in a width direction for driving the shaft 48 by the motor 47. The driving force transmitting shaft 48 is in turn operatively connected to the screw shaft 36 (FIG. 2) through a direction changing gear mechanism 50 fixed to each front end of the upper rails 12 (FIGS. 3 and 6). The driving force transmitting shaft 48 is a rod of square shape having four vertices in cross section. When the motor 47 receives the electricity from an electric source supply unit (not shown), the motor is rotated to generate a rotation torque. The rotation torque is transmitted to the screw shaft 36 through the transmitting shaft 48 and the direction changing gear mechanism 50. The reinforcement bracket 46 is made from a lengthy member with a downward opening and has a pair of side flange portions 46 in a front/rear direction. The reinforcement bracket 46 further includes a pair of fixing portions 46b for supporting the direction changing gear mechanism 50 and an enclosure portion 46c at a relatively right side position deviated from the intermediate portion of the reinforcement bracket 46 for fixing the speed reduction device 90 and the drive motor 47. (FIG. 5).

The fixing portion 46b includes a plurality of slit portions (a second engaging portion) 49 arranged in two lines for engaging therein a detent pawl (a first engaging portion) 70 of a gear cover 71 (later explained in detail). These slit portions form a portion to be engaged and the detent pawls form the engaging portion. The side flange portions 46a include through holes 44 penetrated in a front/rear direction. Each gear cover 71 includes a through hole 79 penetrated in a front/rear direction. The gear cover 71 and the reinforcement bracket 46 are assembled together by means of bolts 52 to be inserted into the through holes 79 and 44 by agreeing each axial center.

The enclosure portion 46c includes a pair of enclosing projections 43 equally separated from each other at each side flange portion 46a. The length of the projection 43 is approximately equal to the thickness of the detent portion 45 of the speed reduction device 90. The detent portion 45 and a damper 42 are fixed to the reinforcement bracket 46 by bending to enclose the projections 43. The damper 42 is made of a rubber material and having a ceiling wall portion 42a, a pair of sidewall portions 42b and a pair of bottom brim portions 42c. The upper surface of the ceiling wall portion 42a is in contact with an inner lower surface of the reinforcement bracket 46 and a disc shaped projection 41 is provided on the central portion of the upper surface of the ceiling wall portion 42a and the projection 41 is engaged with a positioning hole 40 provided on the reinforcement bracket 46 at the middle portion of the enclosure portion 46c between the enclosing projections 43. The detent portion 45 is enclosed and supported by the under surface of the ceiling wall portion 42a, the inner surfaces of the side wall portions 42b and the upper surfaces of the bottom brim portions 42c. Thus, the speed reduction device 90 is fixed to the reinforcement bracket 46 with an elasticity caused by the damper 42 and this can absorb the vibrations occurred at the motor 47 or the speed reduction device 90 to prevent such vibration from transmitting to the reinforcement bracket 46 and eventually to the floor 5 of the vehicle through the upper rails 12.

An L-shaped plate bracket 51 is attached to the under surface of the front side of the upper rails 12 by means of bolts 38. (FIG. 4). The gear housing 53 forms an outer profile of the direction changing gear mechanism 50 and is supported by the plate bracket 51 at the front portion thereof. The gear housing 53 includes a resin-made casing 54 ad the gear cover 71 (FIG. 6).

As shown in FIG. 6, the casing 54 includes a rectangular bottom wall portion 55, a pair of first bearing wall portions 56 and 57 projecting upright from each end of the bottom wall portion 55 in a width direction and a pair of second bearing wall portions 58 and 59 projecting upright from each end of the bottom wall portion 55 in a front/rear direction. The casing 54 has a box shape with an upper opening integrally formed by the bottom wall portion 55, the first bearing wall portions 56, 57 and the second bearing wall portions 58, 59. The first and the second bearing wall portions are separated from each other supported at each one side (lower side) by the bottom wall portion 55. The length of the first bearing wall portion 56, 57 from the bottom wall portion 55 is longer than that of the second bearing wall portion 58, 59. The opposite direction of the first bearing wall portions 56, 57 makes a right angle with the opposite direction of the second bearing wall portions 58, 59.

Each first bearing wall portion 56, 57 includes a stepped portion 60, a first base side wall portion 56a and 57a positioned closer to the base end side (bottom side) than the stepped portion 60 and a first tip side wall portion 56b and 57b positioned closer to the top end side (upper end side) than the stepped portion 60. The distance between the first tip sidewall portions 56b and 57b is longer than that of the first base sidewall portions 56a and 57a. An acute angle guide piece 61 is provided on each of the first tip sidewall portions 56b and 57b. The position of first base side wall portions 56a and 57a is off-set from the position of the first tip side wall portions 56b and 57b in order to easily draw the molding for the casing 54 in a vertical direction.

The first bearing wall portions 56, 57 include a circular first bearing surface 62 respectively provided at a position facing the stepped portion 60. The axial center line of the circular first bearing surface 62 agrees to the axial center line of the driving force transmitting shaft 48 under the condition that the direction changing gear mechanism 50 is attached to the upper rail 12 via the bracket 51.

Figure 7A:
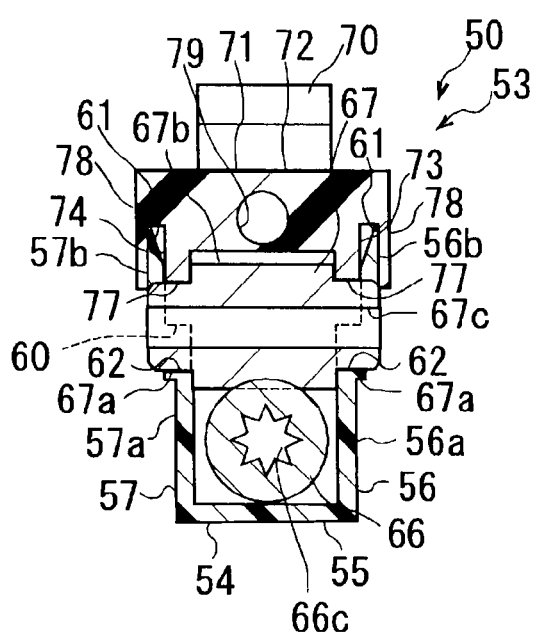
FIG. 7 is a cross sectional view of the direction changing gear mechanism.
Figure 7B:
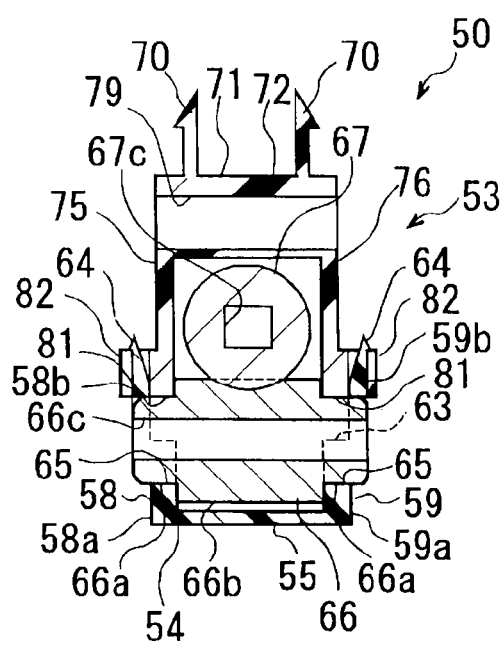

The second bearing wall portions 58, 59 include a stepped portion 63 provided at a lower side than the position of the first bearing surface 62, a pair of second base side wall portions 58a and 59a provided closer to the base end side than the position of the stepped portion 63 and a pair of second tip side wall portions 58b and 59b provided closer to the tip end side than the position of the stepped portion 63. The distance between the second tip sidewall portions 58b and 59b is longer than that of the second base sidewall portions 58a and 59a. A connecting pawl 64 is provided at a middle of the second tip sidewall portions 58b and 59b projecting in a width direction. (FIGS. 6 and 7). An acute angle guide piece 61 is provided on each of the first tip sidewall portions 56b and 57b. The position of second base side wall portions 58a and 59a is off-set from the position of the second tip side wall portions 58b and 59b in order to easily draw the molding for the casing 54 in a vertical direction.

The second bearing wall portions 58, 59 include a circular second bearing surface 65 respectively provided at a position facing the stepped portion 63. The axial center line of the circular second bearing surface 65 agrees to the axial center line of the screw shaft 36 under the condition that the direction changing gear mechanism 50 is attached to the upper rail 12 via the bracket 51.

The helical gear 66 as an output gear is rotatably supported on the second bearing wall portions 58 and 59. As shown in FIGS. 6 and 7, a columnar shaped bearing portion 66a is provided at both ends of the helical gear 66 having an outer diameter equal to an inner diameter of the second bearing surface 65 for sliding engagement therewith. The helical gear 66 includes a gear portion 66b between both axial ends thereof. The gear portion 66b is disposed between the second base sidewall portions 58a and 59a. Both axial end surfaces of the helical gear 66 are in the same plane with the outer surfaces of the second tip sidewall portions 58b and 59b. One end side of the helical gear 66 is provided with an engagement serration hole 66c having eight vertices in an axial direction. (FIG. 7). The serration hole 66c engages with a serration engagement portion 36b having eight vertices provided at the screw shaft 36 in an axial direction. The other end side of the helical gear 66 is provided with a cross-shaped groove 66d (FIG. 6) for adjusting positioning of the rotational phase between the screw shaft 36 and the helical gear 66 by inserting a screw driver or the like into the cross-shaped groove 66d and rotating the helical gear 66 before engagement assembling between the serration hole 66c and the serration engagement portion 36b. (Rotation phase adjustment portion).

A worm gear 67 as an input gear is rotatably supported on the first bearing wall portions 56, 57. The axial length of the worm gear 67 is the same with the distance between the outer surface of the first tip sidewall portion 56b and the outer surface of the first tip sidewall portion 57. A columnar shaped bearing portion 67a is provided at both ends of the worm gear 67 having an outer diameter equal to an inner diameter of the first bearing surface 62 for sliding engagement therewith. The worm gear 67 includes a gear portion 67b between both axial ends thereof. The gear portion 67b is disposed between the first base sidewall portions 56a and 57a. Both axial end surfaces of the worm gear 67 are in the same plane with the outer surfaces of the first tip sidewall portions 56b and 57b.

The worm gear 67 is provided with a rectangular hole 67c (drive shaft side engagement hole) penetrating through the worm gear in an axial direction. The tip end of the transmitting shaft 48 engages with the hole 67c for the unitary rotation between the worm gear 67 and the transmitting shaft 48. The worm gear 67 also engages with the helical gear 66. The helical angle of the gear portion 66b of the helical gear 66 and the helical angle of the gear portion 67b of the worm gear 67 are set to have approximately a right angle between the axial line of the helical gear 66 and the axial line of the worm gear 67 when assembled to the casing 54.

The gear cover 71 includes a rectangular cover wall portion 72, a pair of first support wall portions 73 and 74 projecting from the cover wall portion 72 and facing in a width direction with each other, and a pair of second support wall portions 75 and 76 projecting from the cover wall portion 72 and facing in a front/rear direction. The gear cover 71 is formed with a cover like shape having an opening at the lower side by integrally forming the cover wall portion 72 and the first and second support wall portions. The pair of detent pawls 70 is provided on the upper surface of the cover wall portion 72 facing in a front/rear direction with each other. The pawls 70 engage with the slit portions 49 of the reinforcement bracket 46. The direction changing gear mechanism 50 is assembled to the reinforcement bracket 46 together with the drive motor 47 and the speed reduction device 90 as a unit. The projection length of the first support wall portions 73 and 74 from the cover wall portion 72 is set to be shorter than that of the second support wall portions 75 and 76. The opposite direction of the first support wall portions 73 and 74 makes a right angle with the opposite direction of the second support wall portions 75 and 76.

The tip end surface of the first support wall portions 73 and 74 opposes the stepped portion 60 when the gear cover 71 is mounted on the casing 54 (FIG. 7). Under this condition, the inner surfaces of the first support wall portions 73 and 74 agree with the inner surfaces of the first base sidewall portions 56a and 57a all in the same plane. Similarly, the outer surfaces of the first support wall portions 73 and 74 agree with the inner surfaces of the first tip sidewall portions 56b and 57b, all in the same plane. A semicircular first support surface 77 is provided at the first support wall portions 73 and 74 respectively at the position facing the stepped portion 60. Under the gear cover 71 and the casing 54 being assembled, the first support surface 77 rotatably supports the upper half of the hole (axial shaft portion) 67c of the worm gear 67 within the inner side of the first tip sidewall portions 56b and 57b. Thus the axial shaft portion (hole 67c) of the worm gear 67 is rotatably supported over the entire periphery at the base side closer to the gear portion 67b.

A pair of guide wall portions 78 is provided at the cover wall portion 72 at outer area from the first support wall portions 73 and 74 and extending along the first support wall portions 73 and 74. The first tip side wall portions 56b and 57b (guide piece 61) are inserted between the guide wall portions 78 and the first support wall portions 73 and 74 for guiding the gear cover 71 to be mounted in the casing 54.

On the other hand, when the gear cover 71 is mounted on the casing 54, the tip surfaces of the second support wall portions 75 and 76 oppose the stepped portion 63. Under the condition, the inner surfaces of the second support wall portions 75 and 76 agree with the inner surfaces of the second base sidewall portions 58a and 59a all in the same plane. Similarly, the outer surfaces of the second support wall portions 75 and 76 agree with the inner surfaces of the second tip sidewall portions 58b and 59b, all in the same plane. A semicircular second support surface 81 is provided at the second support wall portions 75 and 76 respectively at the position facing the stepped portion 63. Under the gear cover 71 and the casing 54 being assembled, the second support surface 81 rotatably supports the upper half of the bearing portion (axial shaft portion) 66a of the helical gear 66 within the inner side of the second tip side wall portions 58b and 59b. Thus the axial shaft portion (bearing portion 66a) of the helical gear 66 is rotatably supported over the entire periphery at the base side closer to the gear portion 66b.

As shown in FIG. 6 or 7, a pair of detent wall portions 82 is provided at the tip end of the second support wall portions 75 and 76 and the detent portions 78 are bent back from the both ends the second support wall portions 58b and 59b in a width direction to return towards each other. One (58b) of the second tip sidewall portions 58b and 59b is disposed between the pair of the detent wall portions 82 and one (75) of the second support wall portions 75 and 76. Similarly, the other (59b) of the second tip sidewall portions 58b and 59b is disposed between the pair of the detent wall portions 82 and the other (76) of the second support wall portions 75 and 76. Thus the connecting pawl 64 engages with the upper end of the detent wall portions 82 so that the gear cover 71 may not be loosened from the casing 54. A pair of semicircular adjusting recesses 84 is formed at the lower end side of the detent wall portions 84 to expose the cross-shaped groove 66d outside so that the adjusting of the rotation phase between the screw shaft and the helical gear by rotating the cross-shaped groove 66d with a screw driver even after the casing 54 has been assembled to the gear cover 71.

The through hole 79 is provided at the upper side of the gear cover 71 as explained earlier. The bolt 52 is inserted into the through hole 79 after the gear cover 71 being assembled to the casing 54 and further is inserted into an attaching hole 51a (FIG. 6) of the bracket 51 fixed to the upper rail 12 and finally fastened by a nut member (not shown) at the screw portion projecting rearward out of the attaching hole 51a. Thus, the gear housing 53 (direction changing gear mechanism 50) is fixed to the upper rail 12 through the bracket 51.

Next, the operation of the driving force transmitting device according to the embodiment will be explained hereinafter. First assembling of the direction changing gear mechanism 50 will be explained. As shown in FIG. 6, the helical gear 66 is inserted into the casing from the upper opening of the casing 54 keeping the axial centers of the second bearing surface 65 and the helical gear 66 relative to the casing 54 to agree with each other. During the insertion, the pair of second bearing wall portions 58 and 59 are elastically expanded outward so that the both ends (shaft portions 66a) can be inserted into the second bearing surface 65 to support the second bearing wall portions 58 and 59.

Next, the worm gear 67 is inserted into the casing 54 from the upper opening keeping the axial centers of the first bearing surface 62 and the worm gear 67 relative to the casing 54 to agree with each other. During the insertion, the pair of first bearing wall portions 56 and 57 are elastically expanded outward so that the both ends (shaft portion 67a) can be inserted into the first bearing surface 62 to support the pair of first bearing wall portions 56 and 57 on the shaft portion 67a. At the same time the worm gear 67 engages with the helical gear 66.

Next, the gear cover 71 is inserted into the casing 54 with the helical gear 66 and the worm gear 67 being supported thereon from the upper opening of the casing 54. The gear cover 71 is inserted into the casing 54 guided by the first tip sidewall portions 56b and 57b (guide piece 61) at the guide wall portion 78. Finally the gear cover 71 is fixed to the casing 54 by the engagement between the upper end of the detent wall portion 82 and the connecting pawl 64. The first support surface 77 supports the upper half of the shaft portion 67a within the inside of the first tip side wall portions 56b and 57b and the second support surface 81 supports the upper half of the shaft portion 66a within the inside of the second tip side wall portions 58b and 59b. Thus, the helical gear 66, worm gear 67 and the gear cover 71 are in turn inserted into the casing 54 from the upper opening thereof.

Figure 8:
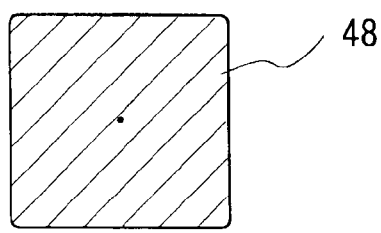
FIG. 8 is a drive shaft with a cross sectional shape.
Figure 9:
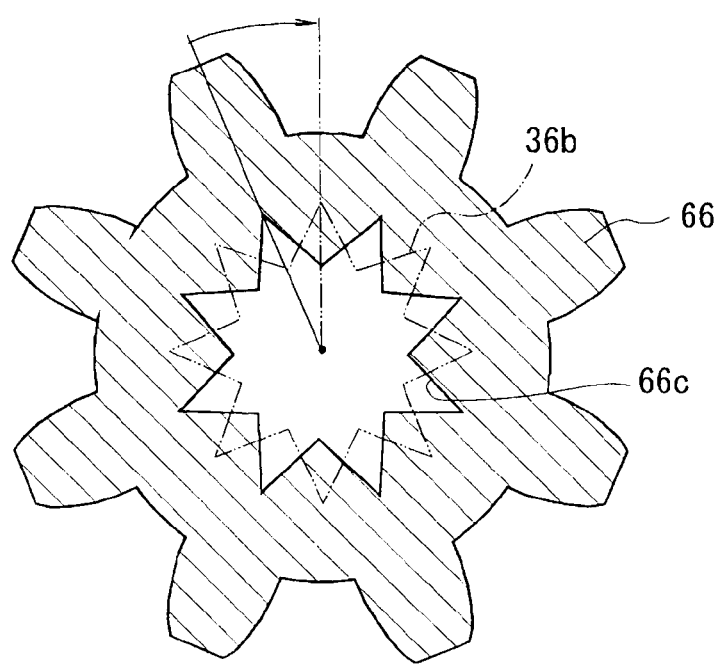
FIG. 9 shows a condition of the output gear, of which rotational phase is deviated, being agreed with the rotational phase of the serration.

Next, the assembling to the reinforcement bracket 46 will be explained. First, the speed reduction device 90 with the drive motor 47 as a unit is assembled to the driving force transmitting shaft 48. The speed reduction device 90 has a rectangular shaped output hole and the output hole is engaged with the driving force transmitting shaft 48, which has a square shape in cross section (FIG. 8). Then the direction changing gear mechanisms 50 are attached to the transmitting shaft 48 at both sides thereof. This assembling is carried out by engaging the square shape engaging hole 67c of the worm gear 67 (input gear) with the tip end portion of the transmitting shaft 48.

Next, as shown in FIG. 5, the damper 42 is assembled to the speed reduction device 90. First the damper 42 is positioned disc shape projection 41 to be at the upper side and the bottom portions 42c to be in parallel with each other. Then the damper 42 is slidably moved in a right/left direction to be in engagement with the detent portion 45. The speed reduction device 90 (drive motor) with the damper 42 is assembled to the reinforcement bracket 46. The damper 42 assembled as a unit with the speed reduction device 90 is positioned to agree with the proper position of the enclosure portion 46c of the reinforcement bracket 46 and then is inserted into the reinforcement bracket 46 from the underside thereof. The disc shaped projection 41 is inserted into the positioning hole 40 of the reinforcement bracket 46 for temporarily connecting the sub-assembled speed reduction device 90 with the reinforcement bracket 46, sandwiching the damper 42 at both side flange portions 46a. The direction changing gear mechanisms 50 are then assembled to the reinforcement bracket 46 by positioning the detent pawl 70 of the direction changing gear mechanism 50 to the slit portions 49 and then engaging the detent pawl 70 with the slit portions 49 to attach the direction changing gear mechanism 50 to the reinforcement bracket 46. The relative position of the direction changing gear mechanisms 50 in a right and left direction can be adjusted within a predetermined range. This is because the length of the slit portions 49 in a right and left direction is set to be longer than the width of the detent pawl 70 in a right and left direction. Then, the enclosure portions 43 projecting from the side flange portions 46a are bent inwardly to enclose the damper 42 in the reinforcement bracket 46 to complete the assembly from the temporal connecting condition. Thus, the drive motor 47, driving force transmitting shaft 48 and the direction changing gear mechanism 50 are assembled to the reinforcement bracket as a unit to form a driving force transmitting device.

Next, as shown in FIG. 4, the unit of the direction changing gear mechanism 50 is assembled to the upper rail 12. Before assembly, the through hole 44 of the fixing portion 46b of the reinforcement bracket 46, the through holes 79 of the right and left direction changing gear mechanisms 50 and the attaching hole 51a of the bracket 51 fixed to the upper rail 12 are positioned to be in a line. At the same time, the serration engagement portion 36b of the screw shaft 36 is engaged into the engagement hole 66c of the helical gear 66 (output gear). If the rotation phase between the serration engagement portion 36b and the engagement hole 66c is different (difference between vertex of the serration and valley of the hole), a screw driver is inserted from the recess 84 into the cross-shaped groove to rotate the helical gear 66 for adjusting the rotation phase deviation with the screw shaft.

Next, under the holes 44, 79 and 51a to be in line as mentioned above, the bolt 52 is inserted in turn into the holes and after the bolt is inserted into the attaching hole 51a, a nut member (not shown) is used to fasten the bolt to finally fix the unit (drive motor 47, shaft 48 and the direction changing gear mechanism 50) to the upper rail 12.

The operation of the driving force transmitting device thus assembled will be explained hereinafter. First, motor 47 is activated and the speed reduction device 90 decelerates the rotation speed of the motor 47. Thus speed-reduced rotation of the motor is transmitted to the driving force transmitting shaft 48 through the output gear of the speed reduction device 90. The rotation of the transmitting shaft drives to rotate the worm gear 67 of the direction changing gear mechanism 50 connected to the both sides of the transmitting shaft 48. Upon rotation of the worm gear 67, the helical gear 66 engaged with the worm gear 67 is rotated changing the rotation axis line to a rotation axis line extending in a front/rear direction. Then, the screw shaft 36 engaged with the helical gear 66 is rotated. When the screw shaft 36 is rotated, the relative rotation direction between the screw portion of the screw shaft 36 and the nut member 31 is converted into the relative movement in a front/rear direction. Since the nut member 31 is fixed to the lower rail 11, the screw shaft 36 (i.e., upper rail 12) is relatively moved in a front/rear direction relative to the lower rail 11 to move the seat 1 relative to the vehicle floor 5. Thus the position of the seat can be adjusted in a front/rear direction. The engagement of the screwed portion of the screw shaft 36 and the nut member 31 restricts the sliding movement of the upper rail 12 relative to the lower rail 11 upon a load applied on the upper rail 12 from the seat in a front/rear direction. Thus the seat 1 position can be kept to a desired position after adjustment.

According to the driving force transmitting device as explained, since a cross-shaped groove 66d is provided at the helical gear 66 in an outside exposed portion, a screw driver can be inserted from outside to adjust the rotation phase difference between the engagement hole 66c of the helical gear and the engagement portion 36b of the screw shaft 36 by just rotating the helical gear upon occurrence of any rotation phase deviation when assembling the helical gear to the screw shaft.

Figure 10:
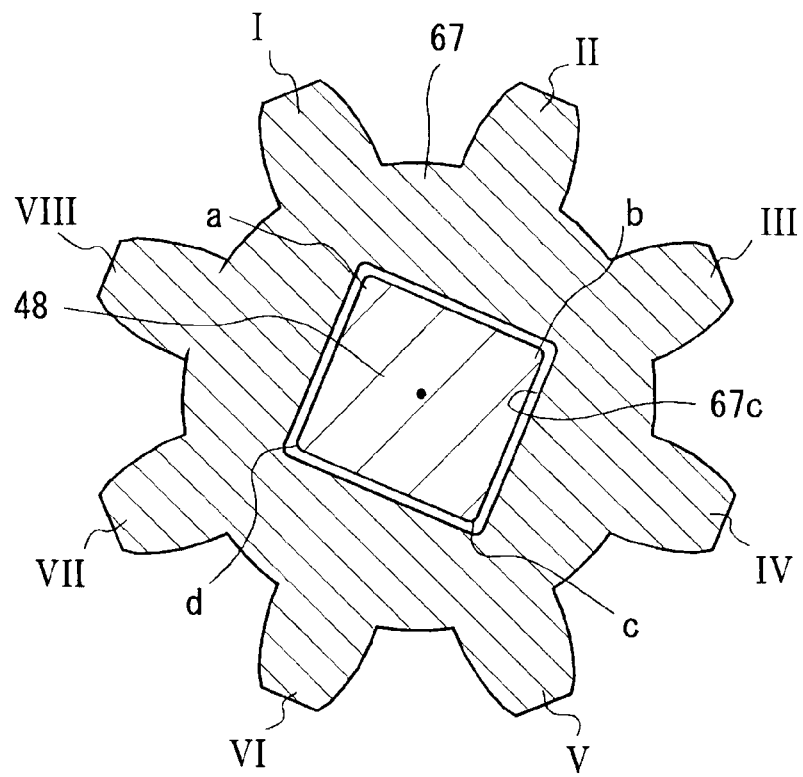
FIG. 10 shows the drive shaft and the input gear being engaged with each other.
Figure 11:
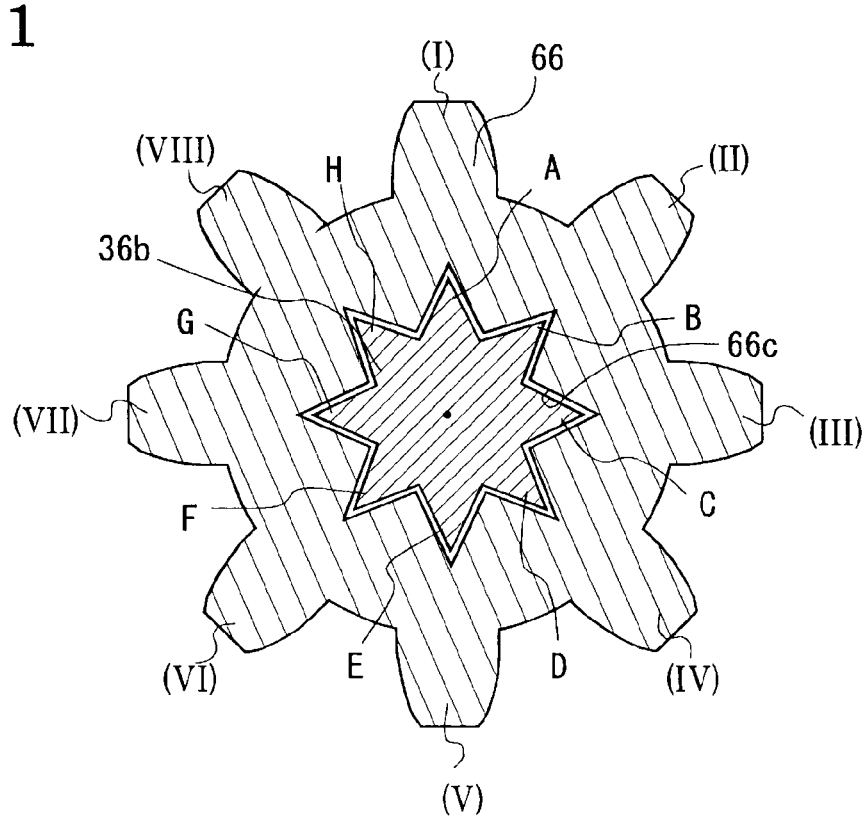
FIG. 11 shows the output gear and the screw shaft being engaged with each other

Worm gear has eight (8) teeth which number is the multiples of four (4) which is the number of vertex of the transmitting shaft 48 and accordingly, as shown in FIG. 10, if one of the vertices of the transmitting shaft 48 agrees to one of the teeth of the worm gear 67, for example the tooth tip I, the other vertices a, b, c and d correspond to any one of the tooth tips III, V, VII. Accordingly, the rotation positions of the tooth tips of the right and left side worm gears 67 always agree to each other and accordingly, the worm gear 67 can be easily assembled to the transmitting shaft 48 with any desired rotation phase. The helical gear 66 engaged with the worm gear 67 has the same number of tooth and accordingly the helical gear rotates with the worm gear with one-on-one relationship. It is easy to agree one tooth tip of the helical gear 66 to the corresponding vertex of the transmitting shaft 48 and the number of vertex of the serration engagement portion 36b is eight (8), which corresponds to the number of the tooth of the helical gear 66. As shown in FIG. 11, if one tooth tip I agree to one vertex A of the serration engagement portion 36b, the other tooth tips (II) to (VIII) fall on one of the other vertices B to H. Accordingly, the rotation positions (engagement hole 66c) of the tooth tips of the helical gear 66 of the right and left side direction changing gear mechanisms 50 always agree to each other and accordingly, one of the vertices of the serration engagement portion 36b can be easily set to agree to one of the tooth tip (engagement hole 66c) of the helical gear 66. According to the embodiment, it is easy to agree the rotation phase (for example, the tooth tip rotation position) between the right and left side helical gears 66 and to agree the rotation phase of the serration engagement portion 66c (for example, the valley rotation position) to the engagement portion 36b of the screw shaft 36, if the rotation phase (for example, the vertex rotation position) of the serration engagement portion 36b of the right and left side screw shafts 36. This can lead to the speedy assembling work. The number of tooth of the worm gear 67 is the integral multiple number of the vertex of the transmitting shaft 48 (drive shaft) and the number of tooth of the worm gear 67 is the same number of vertex of the transmitting shaft 48 or greater than that number. When one of the tooth tips of the worm gear 67 corresponds to one of the vertices of the transmitting shaft 48, the remaining tooth tips necessarily agree to one of the remaining vertices of the transmitting shaft 48. It is necessary for the number of vertex of the serration engagement portion 36b to be the same number or more of the helical gear tooth.

Under the rotation phase of the worm gear 67 and the helical gear 66 being in agreement with each other at the right and left side direction changing gear mechanisms 50, the mechanisms 50 are assembled to the high rigidity reinforcement bracket 46 as a unit. Thus the engagement position would not be deviated upon engagement with the screw shaft 36, and accordingly, the mechanism 50 is easy to be assembled to the screw shaft as a unit with the right and left rails of upper and lower rails 12 and 11. Further, since the transmitting shaft 48, direction changing gear mechanism and the drive motor are integrally formed as a unit, storage handling and the deliver handling become easy and a speedy work of assembling the unit to the screw shaft is achieved.

When the driving force transmitting device is applied to a seat slide device 2, since the screw shaft can be adjusted in an axial direction by exposing adjusting cross-shaped groove outside, the adjusting work is efficiently carried out without any interference of circumferential devices near the screw shaft.

The engagement portion (detent pawl 70) of the gear housing 53 and the engagement portion (slit portion 49) of the reinforcement bracket 46 are relatively slidably engaged with each other in a right/left direction. This can absorb any deviation which may occur upon assembling of the gear housing to the upper rails 12 in a right and left direction on a pitch length between the two parallel upper rails 12 to be fixed to the vehicle floor 5. Thus, the assembling efficiency can be highly improved.

According to the embodiment, the driving force transmitting device is formed as a unit by the reinforcement bracket 46. However, any type of connecting bracket may be used as far as such bracket supports the drive motor 47, transmitting shaft 48 and the direction changing gear mechanism 50 as a unit.

According to the embodiment, the direction changing gear mechanism 50 includes a worm gear as an input gear and a helical gear as an output gear. However, it is not limited to this type and a direction changing gear mechanism including two helical gears engaging with each other may be used or another direction changing gear mechanism including a worm gear and a worm wheel as an input gear and an output gear may be used.

According to the embodiment, the cross-shaped groove 66d is provided at the helical gear 66 as used as an output gear, however, such groove may be provided at an end of the worm gear used as an input gear for adjusting the rotation phase. In this case, the worm gear is rotated by using a screwdriver to rotate the output gear engaged with the worm gear for adjusting the rotation phase. Further, the groove may be not limited to the cross-shaped type, but any type, such as for example, a minus-shaped or hexagon-shaped groove may be used, as long as it can be rotated for adjusting the relative phase deviation between the output and input gears.

According to the embodiment, the engagement between the output gear (helical gear 66) and the screw shaft 36 is a serration engagement, but the engagement is not limited to this type. A spline engagement or any other engagement means can be used as long as such engagement can restrict the relative rotation.

According to the embodiment, the shape of the transmitting shaft 48 or the drive shaft has a square shape in cross section, but any shape such as for example, a hexagon shape in cross section may be used as long as the shaft can be inserted into the worm gear as an input gear for restricting the relative rotation.

According to the embodiment, the number of tooth of the worm gear and the helical gear is set to be eight (8), which is the multiples of two (2) of the number of vertex of the transmitting shaft 48. However, this number may be set to be twelve (12), which is the multiple of three (3) of the number of vertex of the transmitting shaft 48. The number of vertex of the serration engagement portion can be changed from eight (8) to twelve (12), which is the multiple of two of the number of tooth of the helical gear 66.

According to the embodiment, the cross-shaped groove 66d is always exposed outside for easy adjusting from outside. However, a cover can be provided over the adjusting portion and the cover is opened when necessary for adjusting.

According to the embodiment, the driving force transmitting device is adapted to the vehicle seat slide device. However, the driving force transmitting device of this invention can be adapted to a seat lifter device or the like.

According to one aspect of the embodiment, since the rotation phase adjusting portion (66d) is provided at one of the input and output gears 67, 66 and is exposed outside, upon assembling the output gear 66 to the driven shaft 36 by the engagement between the engaging hole 66c of the output gear 66 and the engaging portion 36b of the driven shaft 36, even if the rotation phase between the engaging hole 66c and the engaging portion 36b is deviated, the rotation phase of the engaging hole 66c of the output gear can be adjusted by the rotation phase adjusting portion 66d to easily and promptly assemble the output gear 66 and the driven shaft 36.

According to another aspect of the embodiment, the drive shaft 48 has an equiangular polygonal shape in cross section having vertices A to H, the number of which is "n", the input gear includes a driven shaft side engagement recess for engaging with the drive shaft, the number of tooth of each input gear and output gear is set to be the integral multiple of "n" and wherein the second engagement portion has an equiangular polygonal shape in cross section having vertices, the number of which is the integral multiple of the number of tooth of the output gear.

According to the aspect of the disclosure, since the number of tooth of the input gear is set to be an integral multiple number of "n" which corresponds to the number of vertex of the drive shaft, as long as one tooth tip of the input gear agrees to one vertex of the drive shaft, any of the other tooth tips inevitably falls on any of the other vertices of the drive shaft. Accordingly, the input gear can be easily assembled to the drive shaft with any desired rotation phase. The output gear engaged with the input gear has the same number of tooth with the input gear and accordingly the output gear rotates with the input gear with one-on-one relationship. It is easy to agree one tooth tip of the output gear to the corresponding vertex of the driven shaft and the number of vertex of the engagement portion of the driven shaft is the integral multiple number of the tooth of the output gear.

According to still another aspect of the disclosure, the drive shaft, the direction changing gear mechanism and an actuator for driving the drive shaft are formed as a unit.

According to this aspect of the disclosure, since the drive shaft, the direction changing gear mechanism and an actuator for driving the drive shaft are formed as a unit, the delivery and storage handlings can be easily and quickly performed. And assembling to the driven shaft can be facilitated.

According to still further aspect of the disclosure, the driven shaft includes a pair of driven shafts provided in parallel to each other, the drive shaft is provided between the pair of driven shafts intersecting therebetween with a right angle and wherein each of the pair of driven shafts includes the direction changing gear mechanism.

According to this aspect, upon assembling the engaging hole of the output gear to the engaging portion of the pair of driven shafts placed in parallel with each other, even if the rotation phase between the engaging hole and the engaging portion is deviated, the rotation phase of the engaging hole of the output gear can be adjusted by the rotation phase adjusting portion to easily and swiftly assemble the output gear and the driven shaft.

Further, by setting the number of tooth of the input gear to the integral multiple of "n" which is the number of vertex of the drive shaft and agreeing one of the tooth tips of the input gear to one of the vertices of the drive shaft, any one of the other tooth tip agrees to any one of the other vertices of the drive shaft. Thus the rotation position of each input gear provided at both end sides of the drive shaft always agrees with each other to facilitate the assembling of the input gear to the drive shaft.

Further, by setting the number of the vertex of the drive shaft to the integral multiple of tooth number of the output gear and agreeing one of the vertices of the engaging portion of the driven shaft to one of the tooth tips of the output gear, any one of the other vertices agrees to any one of the other tooth tips of the drive shaft. Thus the valley portion of the engaging hole of the output gear can be positioned to the corresponding position of the vertex of the engaging portion of the driven shaft via the rotation position of tooth tip of the output gear.

According to the disclosure of this application, as long as each rotation position of each vertex of the engaging portion of the pair of driven shafts is set to agree with each other, each rotation position of the tooth tip of the output gear engaged with respective engaging portions agrees with each other and further, the rotation position of the valley portion of the engaging hole of the output gear can be easily set to agree with the rotation position of the vertex of the engaging portion of the driven shaft to further quickly assemble the output shaft and the driven shaft.

According to a further aspect of the disclosure, a reinforcement bracket extending in an axial direction of the drive shaft and supporting the unit formed by the drive shaft, the direction changing gear mechanism and the actuator for driving the drive shaft.

According to this aspect, since the number of tooth of the input gear is an integral multiple number of "n" which is the number of vertex of the drive shaft, as long as one tooth tip of the input gear agrees to one vertex of the drive shaft, each of the other tooth tips inevitably falls on one of the other vertices. Accordingly, the input gear can be easily assembled to the drive shaft with any desired rotation phase.

According to an aspect of the disclosure, a first engaging portion is provided at each gear housing of each direction changing gear mechanism and a second engaging portion is provided at each end of the reinforcement bracket for engaging with the first engaging portion and wherein a relative movement between the first and second engaging portions under engagement in both vertical and horizontal directions is restricted, but a relative movement in an axial direction is allowed within a predetermined value.

According to this aspect, the detent portion of the gear housing and the engagement portion of the reinforcement bracket are relatively slidably engaged with each other in a right/left direction. This can absorb any deviation, which may occur upon assembling of the gear housing to the upper rails in a right and left direction on a pitch length between the two parallel upper rails to be fixed to the vehicle floor. Thus, the assembling efficiency can be highly improved.

According to another aspect of the disclosure, the rotation phase adjusting portion is exposed outside for adjusting from outside in an axial direction relative to the driven shaft.

According to this aspect, since the screw shaft can be adjusted in an axial direction by exposing adjusting cross-shaped groove outside, the adjusting work is efficiently carried out without any interference of circumferential devices near the screw shaft.

According to a still further aspect of the disclosure, in a vehicle seat slide device with the driving force transmitting device, the driven shaft is adapted to be used as a screw shaft rotatably supported by one of both lower rails secured to a vehicle floor and both upper rails slidably supported by the lower rails and supporting thereon a vehicle seat and wherein a relative sliding movement of the upper rails relative to the lower rails is carried out by relatively moving a nut member engaged with the screw shaft in an axial direction of the screw shaft, the nut member being fixed to the other one of the both upper rails and the both lower rails, and the rotation torque being transmitted from the drive shaft to the screw shaft via the direction changing gear mechanism.

According to this aspect, in the vehicle seat slide device, the rotation position of the vertex of each of the engaging portions of the screw shaft rotatably supported on one of the upper and lower rails is set to agree with each other in advance, the rotation position of the tooth tip of each of the output gear engaged with the screw shaft agrees with each other and accordingly, the rotation position of the valley of each of the engaging hole of the output gear can easily agree to the rotation position of the engaging portion of the screw shaft. This structure leads to an easy or simple assembling of the direction changing gear mechanism to the screw shaft.

The principles, preferred embodiment and mode of operation of the present invention have been described in the foregoing specification. However, the invention, which is intended to be protected, is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents, which fall within the spirit and scope of the present invention as defined in the claims, be embraced thereby.

The invention claimed is:

1. A driving force transmitting device having a direction changing gear mechanism which transmits a rotation torque from a drive shaft to a driven shaft having a rotation axis extending in a direction different from an extending direction of a rotation axis of the drive shaft, the direction changing gear mechanism comprising:

an output gear having an engagement hole engaging with an engagement portion provided at an axial end portion of the driven shaft for restricting a relative rotation therebetween;

an input gear attached to the drive shaft and engaged with the output gear for restricting a relative rotation; and a gear housing rotatably supporting the output gear and the input gear under engagement condition, wherein one of the output gear and the input gear is provided with a rotation phase adjusting portion exposed outside for adjusting a rotation phase of the output gear relative to a rotation phase of the engagement portion of the driven shaft upon the output gear being assembled to the driven shaft.

2. The driving force transmitting device according to claim 1, wherein the drive shaft has an equiangular polygonal shape in cross section having vertices, a number of which is "n", the input gear includes a driven shaft side inserting recess into which the drive shaft is inserted, a number of teeth of each input gear and output gear is set to be an integral multiple of "n" and wherein the engagement portion has an equiangular polygonal shape in cross section having vertices, a number of which is the integral multiple of the number of teeth of the output gear.

3. The driving force transmitting device according to claim 1, wherein the drive shaft, the direction changing gear mechanism and an actuator for driving the drive shaft are formed as a unit.

4. The driving force transmitting device according to claim 2, wherein the drive shaft, the direction changing gear mechanism and an actuator for driving the drive shaft are formed as a unit.

5. The driving force transmitting device according to claim 1, wherein the driven shaft includes a pair of driven shafts provided in parallel to each other, the drive shaft is provided between the pair of driven shafts intersecting therebetween with a right angle and wherein each of the pair of driven shafts includes the direction changing gear mechanism.

6. The driving force transmitting device according to claim 2, wherein the driven shaft includes a pair of driven shafts provided in parallel to each other, the drive shaft is provided between the pair of driven shafts intersecting therebetween with a right angle and wherein each of the pair of driven shafts includes the direction changing gear mechanism.

7. The driving force transmitting device according to claim 3, wherein the driven shaft includes a pair of driven shafts provided in parallel to each other, the drive shaft is provided between the pair of driven shafts intersecting therebetween with a right angle and wherein each of the pair of driven shafts includes the direction changing gear mechanism.

8. The driving force transmitting device according to claim 5, further comprising a reinforcement bracket extending in an axial direction of the drive shaft and supporting a unit formed by the drive shaft, the direction changing gear mechanism and an actuator for driving the drive shaft.

9. The driving force transmitting device according to claim 6, further comprising a reinforcement bracket extending in an axial direction of the drive shaft and supporting a unit formed by the drive shaft, the direction changing gear mechanism and an actuator for driving the drive shaft.

10. The driving force transmitting device according to claim 7, further comprising a reinforcement bracket extending in an axial direction of the drive shaft and supporting a unit formed by the drive shaft, the direction changing gear mechanism and an actuator for driving the drive shaft.

11. The driving force transmitting device according to claim 8, wherein a first engaging portion is provided at each gear housing of each direction changing gear mechanism and a second engaging portion is provided at each end of the reinforcement bracket for engaging with the first engaging portion and wherein a relative movement between the first and second engaging portions under engagement in both vertical and horizontal directions is restricted, but a relative movement in an axial direction is allowed within a predetermined value.

12. The driving force transmitting device according to claim 9, wherein a first engaging portion is provided at each gear housing of each direction changing gear mechanism and a second engaging portion is provided at each end of the reinforcement bracket for engaging with the first engaging portion and wherein a relative movement between the first and second engaging portions under engagement in both vertical and horizontal directions is restricted, but a relative movement in an axial direction is allowed within a predetermined value.

13. The driving force transmitting device according to claim 10, wherein a first engaging portion is provided at each gear housing of each direction changing gear mechanism and a second engaging portion is provided at each end of the reinforcement bracket for engaging with the first engaging portion and wherein a relative movement between the first and second engaging portions under engagement in both vertical and horizontal directions is restricted, but a relative movement in an axial direction is allowed within a predetermined value.

14. The driving force transmitting device according to claim 1, wherein the rotation phase adjusting portion is exposed outside for adjusting from outside in an axial direction relative to the driven shaft.

15. The driving force transmitting device according to claim 2, wherein the rotation phase adjusting portion is exposed outside for adjusting from outside in an axial direction relative to the driven shaft.

16. The driving force transmitting device according to claim 3, wherein the rotation phase adjusting portion is exposed outside for adjusting from outside in an axial direction relative to the driven shaft.

17. The driving force transmitting device according to claim 5, wherein the rotation phase adjusting portion is exposed outside for adjusting from outside in an axial direction relative to the driven shaft.

18. The driving force transmitting device according to claim 8, wherein the rotation phase adjusting portion is exposed outside for adjusting from outside in an axial direction relative to the driven shaft.

19. The driving force transmitting device according to claim 11, wherein the rotation phase adjusting portion is exposed outside for adjusting from outside in an axial direction relative to the driven shaft.

20. A vehicle seat slide device with the driving force transmitting device according to claim 1, wherein the driven shaft is adapted to be used as a screw shaft rotatably supported by one of both lower rails secured to a vehicle floor and both upper rails slidably supported by the lower rails and supporting thereon a vehicle seat and wherein a relative sliding movement of the upper rails relative to the lower rails is carried out by relatively moving a nut member engaged with the screw shaft in an axial direction of the screw shaft, the nut member being fixed to the other one of the both upper rails and the both lower rails, and the rotation torque being transmitted from the drive shaft to the screw shaft via the direction changing gear mechanism.

* * * * *